(12) United States Patent
Sade et al.

(10) Patent No.: US 7,856,563 B1
(45) Date of Patent: Dec. 21, 2010

(54) MANAGING DISK DRIVE POWER STATES

(75) Inventors: Gilad Sade, Newton, MA (US); Thomas E. Linnell, Northborough, MA (US); Adi Ofer, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 698 days.

(21) Appl. No.: 11/824,414

(22) Filed: Jun. 29, 2007

(51) Int. Cl.
*G06F 1/00* (2006.01)
*G06F 1/26* (2006.01)
*G06F 1/32* (2006.01)

(52) U.S. Cl. .................. 713/300; 713/320; 713/321; 713/323

(58) Field of Classification Search .................. 713/300, 713/320, 321, 323
See application file for complete search history.

(56) References Cited

U.S. PATENT DOCUMENTS

| | | | | |
|---|---|---|---|---|
| 5,481,733 | A * | 1/1996 | Douglis et al. | 713/324 |
| 5,682,273 | A * | 10/1997 | Hetzler | 360/75 |
| 6,892,313 | B1 * | 5/2005 | Codilian et al. | 713/323 |
| 6,986,064 | B2 * | 1/2006 | Yoshimoto et al. | 713/300 |
| 2006/0227605 | A1 * | 10/2006 | Choi et al. | 365/185.08 |
| 2008/0104431 | A1 * | 5/2008 | Shimada | 713/300 |
| 2008/0270699 | A1 * | 10/2008 | Anzai et al. | 711/114 |

* cited by examiner

*Primary Examiner*—Vincent T Tran
(74) *Attorney, Agent, or Firm*—Krishnendu Gupta; Jason A. Reyes; Philip W. Citroen

(57) ABSTRACT

Disk drive power states are managed. Information is received for use in determining a desired power state of a disk drive that is not currently being accessed. The disk drive is caused to have a spun up power state before the disk drive is next accessed.

20 Claims, 8 Drawing Sheets

MANAGING DISK DRIVE POWER STATES

FIELD OF THE INVENTION

The present invention relates generally to the field of disk drives, and particularly to managing disk drive power states.

BACKGROUND OF THE INVENTION

The need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss. And computing systems of all types are not only accommodating more data but are also becoming more and more interconnected, raising the amounts of data exchanged at a geometric rate.

Thus, today's data storage systems are used in computing environments for generating and storing large amounts of critical data. Some storage systems support many (e.g., hundreds) of disk drives. A hard disk drive is typically a device including a magnetic head, a motor, and one or more platters that store information. The motor turns a platter underneath the magnetic head.

The platter contains electrically encoded data that is detected by the magnetic head as the head passes over the platter. The platter can be read from or written to and is generally used to store data that will be accessed by the system. The hard disk drive is typically referred to as random access memory and is familiar to those skilled in the art.

Typically, data is arranged in concentric circles on the platter. The magnetic head is moved along a radius of the platter, and the magnetic head reader/writer accesses particular locations within the platter as the platter spins under the magnetic head. Those skilled in the art are familiar with the read and write operations of hard disk drives.

Constantly spinning the platter in the hard disk drive consumes a large amount of power. Specifically, a motor must be devoted to spinning the platter to allow access to the full physical array of data on the platter.

Powering a mechanical device, such as a motor, consumes a significant amount of power relative to the power consumed by the electronic circuitry within the system.

The consumption of electrical power is a major concern in many environments. For example, in data centers, computing equipment such as storage systems cause power consumption not only directly but also indirectly, because cooling equipment such as air conditioners are required to remove the heat given off by the computing equipment (and in at least some cases, since cooling equipment is not 100% efficient, the indirect consumption exceeds the direct consumption). In another example, power consumption is a major factor in the design and construction of portable computers. At least some of the concern over power consumption relating to portable computers arises due to their reliance upon batteries with a short life, e.g., batteries with a short life due to limited energy storage capacity.

One power management technique commonly used in computers is turning off the hard disk drive motor when the hard disk drive has not been used recently. There are several methods of turning off the hard disk drive motor while leaving the remainder of the computer circuitry on. Many computers include a "sleep" button that the user may depress to power down the hard disk drive motor without powering down the entire computer. Thus, if a user needs to sit and think or perform tasks that do not require access to the hard disk drive, the user can depress the sleep button. Depressing the sleep button powers down the hard disk drive, meaning that the motor stops spinning the platter, but the user will not have to reboot the entire computer to initiate operations again. The Basic Input/Output system driver (BIOS driver) commonly found in personal computers receives the signal from the "sleep" key and controls power down of the hard disk drive. This allows the user to conserve battery power that would otherwise be wasted powering the motor in the hard disk drive when the hard disk drive is not being accessed.

Other methods of powering down the hard disk drive have also been developed. Those skilled in the art are familiar with computers that include a timed power down of a hard disk drive that is controlled by the BIOS driver. The BIOS driver can be programmed to power down the hard disk drive after the passage of a predetermined time period during which the hard disk drive has not been accessed. For example, the BIOS driver can be set to power down the hard disk drive automatically if the hard disk drive is not accessed for five minutes. If the user leaves the computer for longer than the predetermined period of time, the hard disk drive will automatically be powered down to conserve power.

Such an approach to reducing disk drive power consumption also involves repowering the disk drive when system activity resumes. There may be a considerable time delay for a disk drive in the off state to come up to speed (typically on the order of a few seconds—a delay that may in some circumstances be unacceptable to users or applications). Considerable power is required to bring a disk drive from an off state up to speed (which in at least some cases may offset the benefits of depowering it). Frequent depowering/repowering of a drive increases its likelihood of failure.

In a typical practical implementation, a disk drive may consist of circuit board logic and a Head and Disc Assembly (HDA). The HDA portion of the disk drive includes the spindles platters, head arm and motor that make up the mechanical portion of the disk drive. When power is applied to the disk drive, the circuit board logic powers up and the HDA spins up. During spin up, the HDA requires a higher current than when it is in steady state, i.e., already spun up.

Some types of disk drives offer a separate HDA power input but no built in control over the timing of the application of power to the HDA. Some other types offer limited control. For example, Fibre Channel ("FC") disk drives compliant with the SFF-8045 rev. 4.7 standard ("SFF-8045" or "8045") allow the timing of HDA spin up to be controlled via two signal pins, Start_1 and Start_2, that allow the HDA to spin up based on three different conditions. Depending on the state of the Start_1 and Start_2 signals, the disk drive HDA will start drawing current either 1) immediately; 2) after it receives its first SCSI command, or 3) based on its arbitrated loop physical address (ALPA).

SFF-8045 describes a POWER CONTROL (also known as "power control", "Pwr_control", "Pwr_ctrl", or "P_ctl") signal driven to the drive to control 5V and 12V power switches located on the drive. When this signal is asserted, high, 5V and 12V supplies are applied to the drive circuitry. When this signal is negated, low, 5V and 12V supplies are not connected to the drive circuitry, so that the drive circuitry is powered down. As described in SFF-8045, the drive provides a 10 KOhm pull up resistor from this signal to the 5V input to the drive.

SUMMARY OF THE INVENTION

Disk drive power states are managed. Information is received for use in determining a desired power state of a disk drive that is not currently being accessed. The disk drive is caused to have a spun up power state before the disk drive is next accessed.

One or more implementations of the invention may provide one or more of the following advantages.

Disk drives can be made available for data communication quickly and efficiently without excessive use of power. Data centers can save significant amounts of power and expense with little or no adverse affect on performance.

Other advantages and features will become apparent from the following description, including the drawings, and from the claims.

DETAILED DESCRIPTION

Described below is a technique for use in managing disk drive power states. For example, information may be collected about the hours of the day that a disk drive is being used and/or other usage patterns in order to make dynamic determinations that allow power savings and reduced impact on response time. At least some implementations take into account usage and idle time statistics and adjust the power down and/or power up times accordingly, and/or identify the type of application that is using the drives to use as an input for determining whether or when to power down or power up the drive. Depending on the implementation, the technique may provide larger power savings due to a more aggressive power down approach when one is possible, and may save the user from having to manually set a power down or power up policy.

Figure 1:
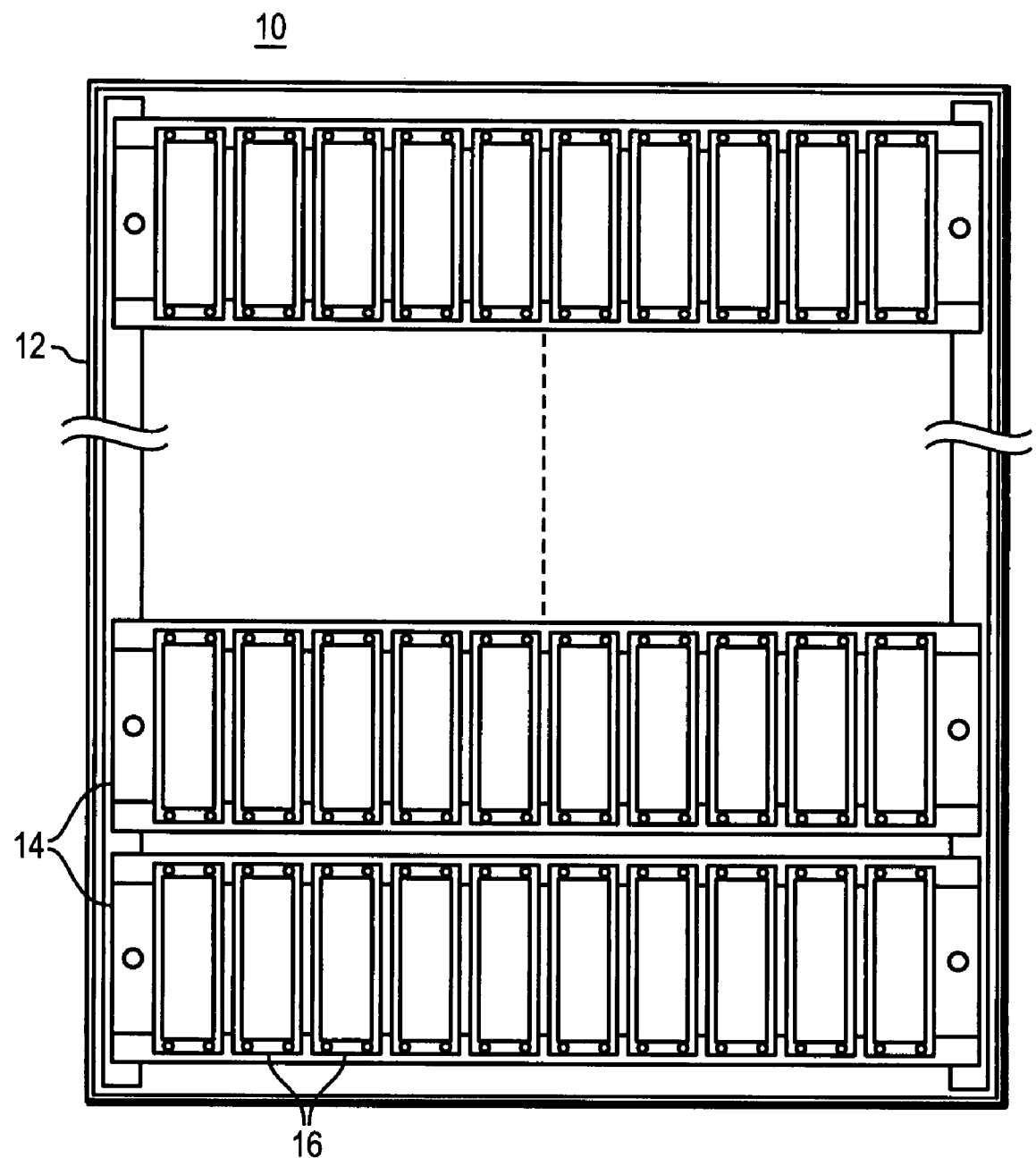
FIG. 1 is a representation of a rack of storage systems in which the invention may be employed.

Referring to FIG. 1, there is shown an example of equipment, specifically a rack mount system 10, in which the technique may be employed. It is to be understood that this is just an example, and the technique may be employed in any of many different types of systems that use one or more disk drives.

A rack mount cabinet 12 includes several storage systems 14. Each storage system 14 has installed therein several disk drives 16.

Figure 2:
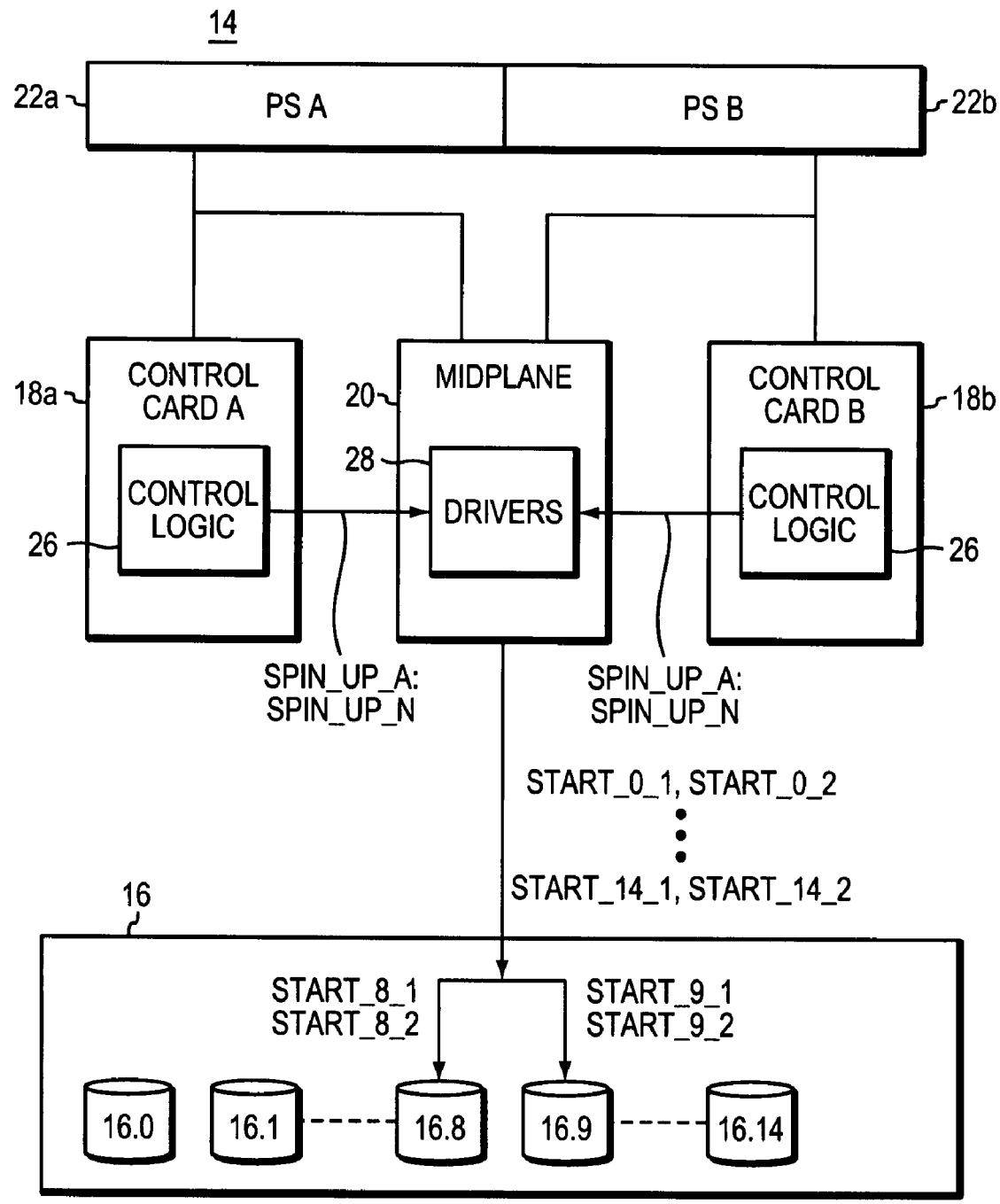
FIGS. 2-4 are schematic representations of components of a storage system of FIG. 1, showing control logic.

The amount of storage in the multi-chassis system can be increased by adding new storage systems 14 to the rack mount system 10, and by adding more disk drives 16 to one or more of the storage systems 14. A functional block diagram of one of the storage systems 14 is shown in FIG. 2. The storage system 14 includes two redundant link control cards (LCCs) 18a and 18b to provide high availability of the system. The LCCs 18a,b are coupled to a midplane 20. Disk drives 16, herein shown as 15 disk drives 16.0-16.14, are also coupled to the midplane 20.

Each LCC 18a,b communicates with all the drives 16.0-16.14 via the midplane 20. Power is supplied to the LCCs 18a,b, the midplane 20, and the disk drives 16 by a redundant set of power supplies 22a,b.

Since each storage system 14 can include up to 15 disk drives 16, it is not reasonable to provide power supplies 22a,b with enough peak power to spin up all 15 disk drives at once. Therefore, the disk drives 16 are spun up in sequential stages. During each sequential stage a certain number of disk drives 16 may be spun up based on parameters related to the power requirements of the system. Control logic 26 controls the timing of disk drive spin up.

In the generalized embodiment shown in FIG. 2, each controller board 18a, 18b includes identical control logic 26 for driving Spin-up signals Spin-up_A-Spin-up_N to drivers 28 on the midplane 20. The disk drives 16 are herein shown to be Fibre Channel drives. A Fibre Channel drive accepts as input two Start signals that switch on power to the HDA portion of the drive. (Start signals are referred to collectively; individual Start signals are referred to with a suffix.) The drivers 28 on the midplane 20 drive these pairs of Start signals to each of the drives. When both Start signals for a given drive are asserted, the HDA portion of the drive spins up.

The drives 16 in the system are preferably hot pluggable, meaning that drives 16 can be plugged into the system not only prior to power up but also at any time after it has been powered up.

Drives 16 in accordance with the 8045 specification accept the input herein denoted Pwr_control. When the Pwr_control signal is asserted, power is provided to the entire drive 16, including the logic board and HDA portions. When Pwr_control is deasserted, no power is provided to either the logic board or HDA. If the drive Start inputs are asserted, and the Pwr_control input is deasserted, the drive will not spin up. On the other hand, if the start bits are asserted, and then the Pwr_control input is asserted, the drive will spin up immediately in response to the assertion of Pwr_control.

Figure 3:
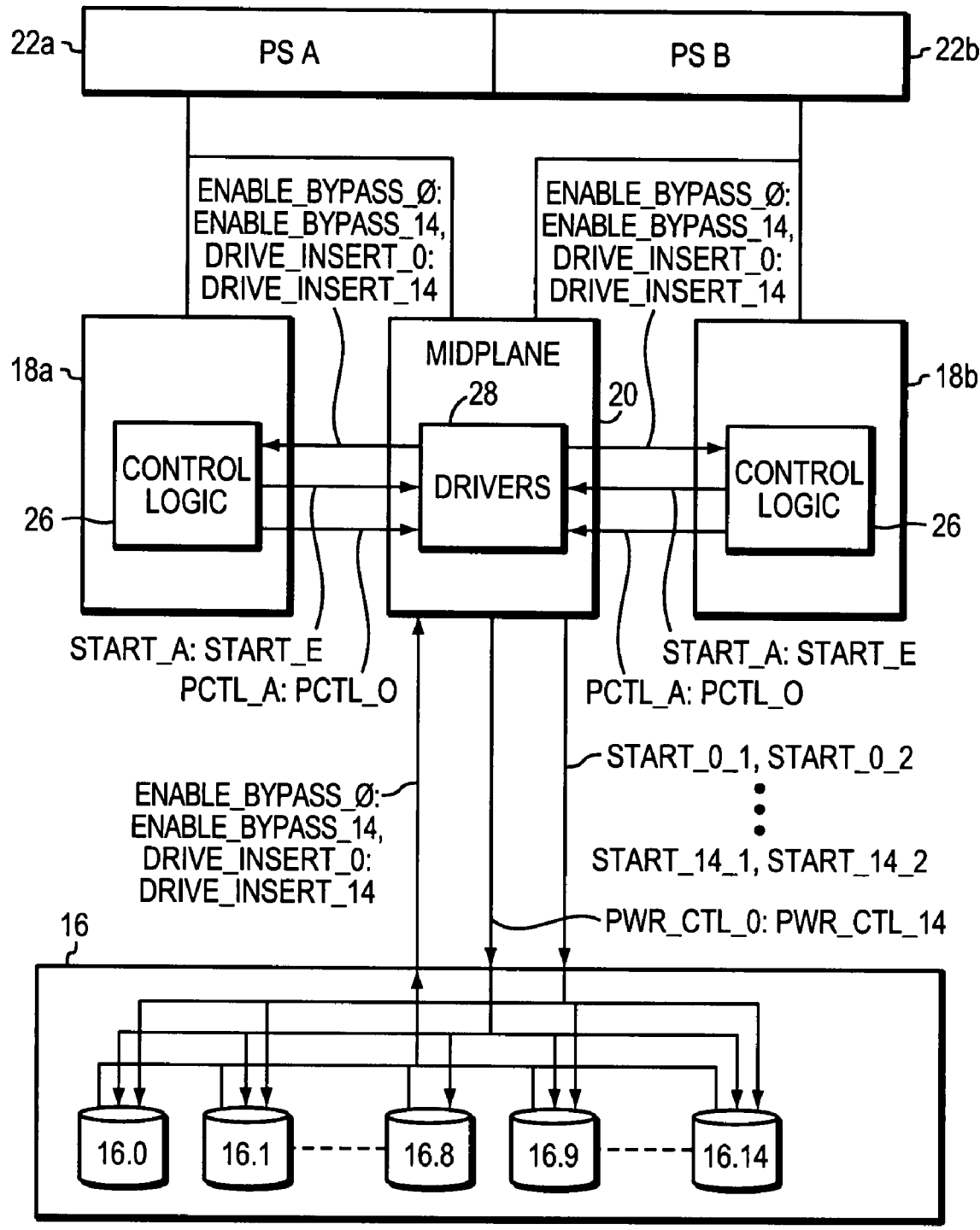

As shown in FIG. 3, the system includes the control logic as shown in FIG. 2. The control logic 26 produces in addition Pctl signals Pctl_A-Pctl_O, which are used to drive Pwr_ctl_0-Pwer_ctl_14 signals to the drives 16.0-16.14 respectively. Each drive 16.0-16.14 provides a corresponding presence (drive inserted) signal Drive_Insert_0-Drive_Insert_14 and can provide a corresponding Enable Bypass signal Enable_Bypass_0-Enable_Bypass_14, each of which is driven to the control logic 26 on each LCC 18a, 18b. When a drive is inserted into the system, the corresponding Drive_Insert signal is asserted.

Figure 4:
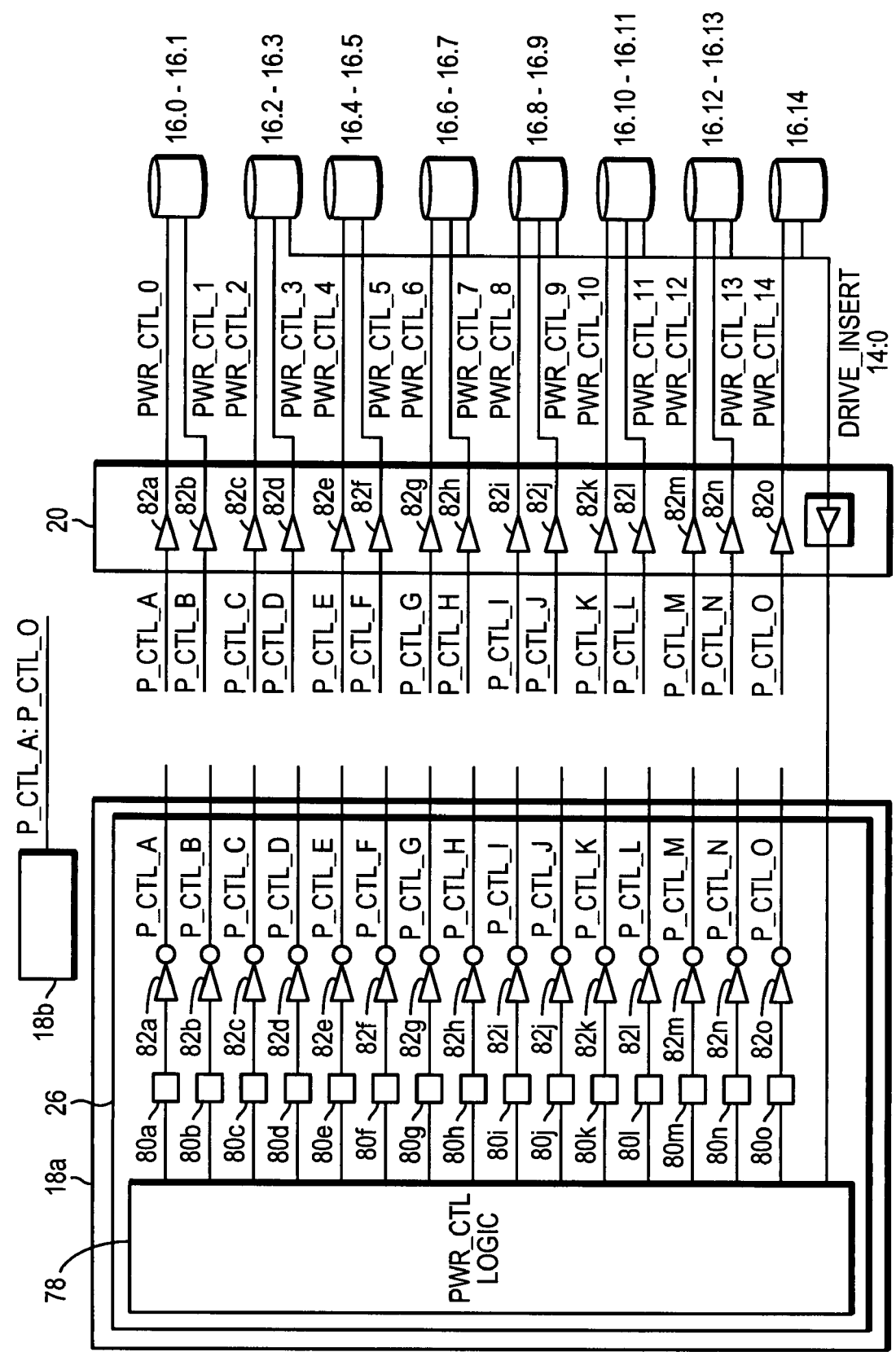

More particularly, as shown in FIG. 4, the control logic 26 further includes power control logic 78. The power control logic 78 accepts as input the Drive_Insert_14 15-Drive_Insert_0 signals from the disk drives 16. The power control logic 78 drives registers 80a-80o. Each register 80a-80o drives a corresponding inverter 82a-82o. The inverters produce as output P_Ctl signals P_Ctl_A-P_Ctl_O. Each signal P_Ctl_A-P_Ctl_O is input to a corresponding driver 84a-84o on the midplane 20. The other LCC 18b also produces the signals P_Ctl_A-P_Ctl_O, and these signals are wire-or'd to the corresponding signals from the LCC 18a. The drivers 84a-84o output Pwr_Ctl signals Pwr_Ctl_0-Pwr_Ctl_14, the Pwr_control signals for corresponding disk drives 16.0-16.14.

In accordance with at least some implementations of the technique, power is saved by powering down ("spinning down") a drive when it is not being used, performance is improved by powering up ("spinning up") the drive before it is first accessed after being spun down, and drive reliability is improved by avoiding thrashing, i.e., avoiding spinning down and spinning up the drive in rapid repetition. Avoiding thrashing also reduces power consumption. Since spinning up the drive from rest can take seconds, having the drive already spun up when it is accessed helps to prevent problems with software applications that react poorly in response to a delay in access.

The technique allows the system to self adjust by analyzing drive access usage and making determinations. For example, if after one minute of inactivity (no attempts to access the drive) it is determined to a sufficient likelihood (e.g., based on previous usage patterns) that the drive will not be accessed again for at least ten minutes, the drive may be spun down immediately. In another example, a policy pertaining to time of day schedule may be applied, so that, for example, the drive is never spun down between 9 am and 5 pm, is spun down after 9 am, and is spun up before 9 am. In such a case, when the drive is first accessed by an application after 9 am, it is already spun up and the application experiences no delay in access due to spin up. In addition or instead, a day of the week schedule may be applied so that, for example, spin up and/or spin down occurs at different time or not at all on weekend days.

Any of multiple different criteria may be used to determine whether the disk is being or has been accessed. For example, accessing the disk's circuit board logic may be considered an access of the disk. In another example, the disk may be deemed accessed only if data signals are read from or provided to the HDA. Since in theory the drive may be powered off completely when it is not needed, it can be useful to make the determination of disk access at a point that is architecturally as close as practicable to the HDA.

Any of multiple different spin up and/or spin down regimes may be used. For example, the disk may be considered spun down if power is removed or reduced for both the circuit board logic and the HDA. In another example, the disk may be considered spun down even if power is removed or reduced only for the HDA. In at least some cases, since the majority of the power consumed by the disk is consumed by the HDA, the management of power to the HDA is more important than management of power to the circuit board logic. In at least some systems, if power is removed for the circuit board logic, the system needs to perform extensive and time consuming reorganization work to allow the disk to rejoin the system once power is restored to the circuit board logic. Thus, in such systems, for performance reasons, it may be desirable to maintain power to the circuit board logic while removing or reducing power for the HDA.

All or a portion of the technique or a distributed version of the technique may be implemented and/or executed at one or more of any of various points in the system's architecture, e.g., at the circuit logic board, at a disk drive controller, in the system's basic input/output system (BIOS) and/or in an operating system. Since a data storage system uses disk drives in sets, it can be important to execute the technique at a point, such as logic 26, where all of the drives in a set may be spun up or spun down at the same time.

Figure 5:
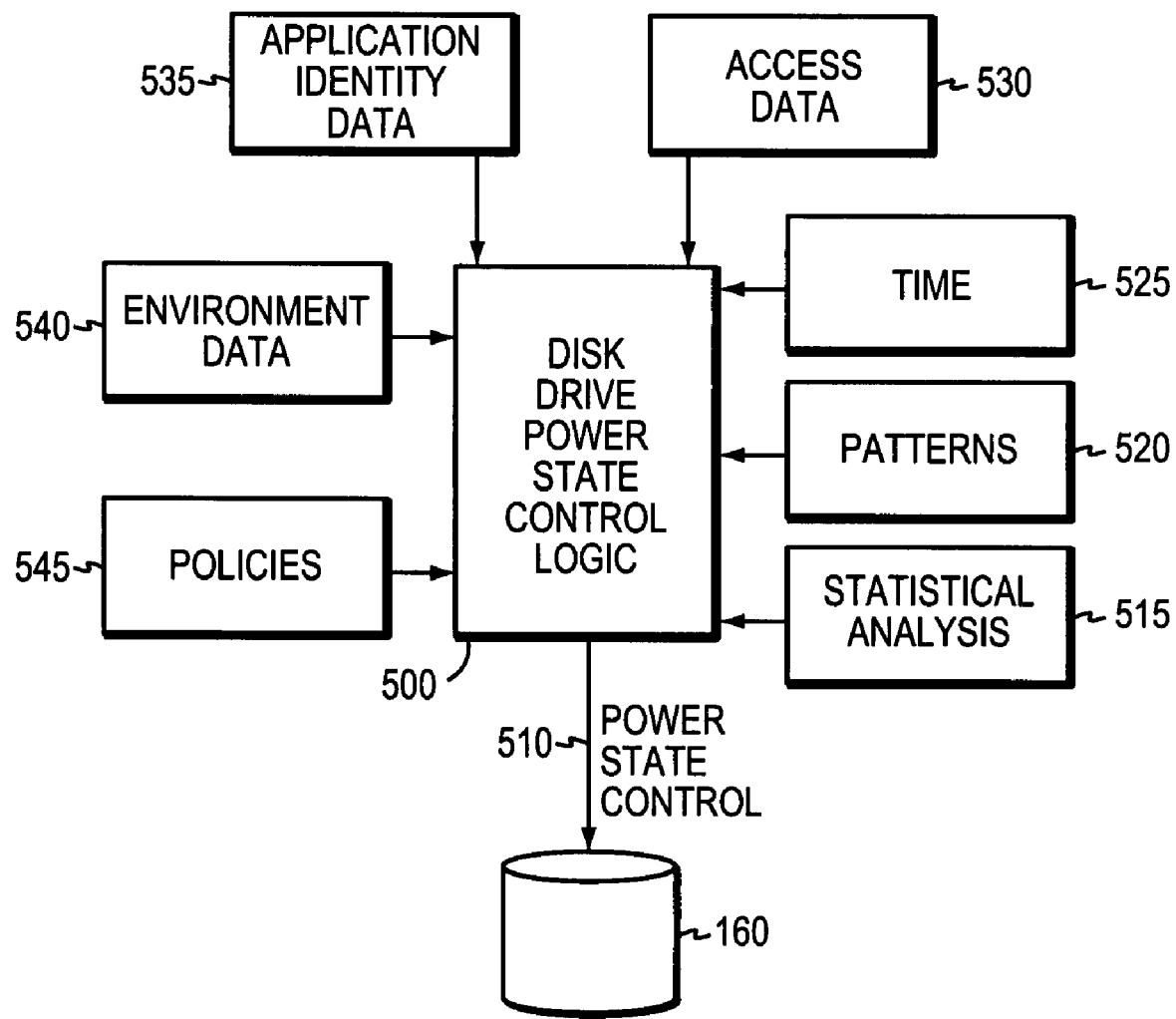
FIG. 5 is a block diagram of logic for use with a storage system of FIG. 1.

FIG. 5 illustrates an example based on the technique, in which disk drive power state control logic 500 (which may be, be included in, or include logic 26) issues a power state control signal 510 (which may be, be included in, or include one or more Pwr_control signals or other power control signals as described above) to a disk drive 160 (which may be, be included in, or include one or more of disks 16). Logic 500 may take as inputs one or more of the following: statistical analysis 515, patterns 520, time 525, access data 530, application identity data 535, environment data 540 (e.g., power pricing, temperature, humidity), policies 545. Other inputs may be in addition to and/or in place of these inputs.

Figure 6:
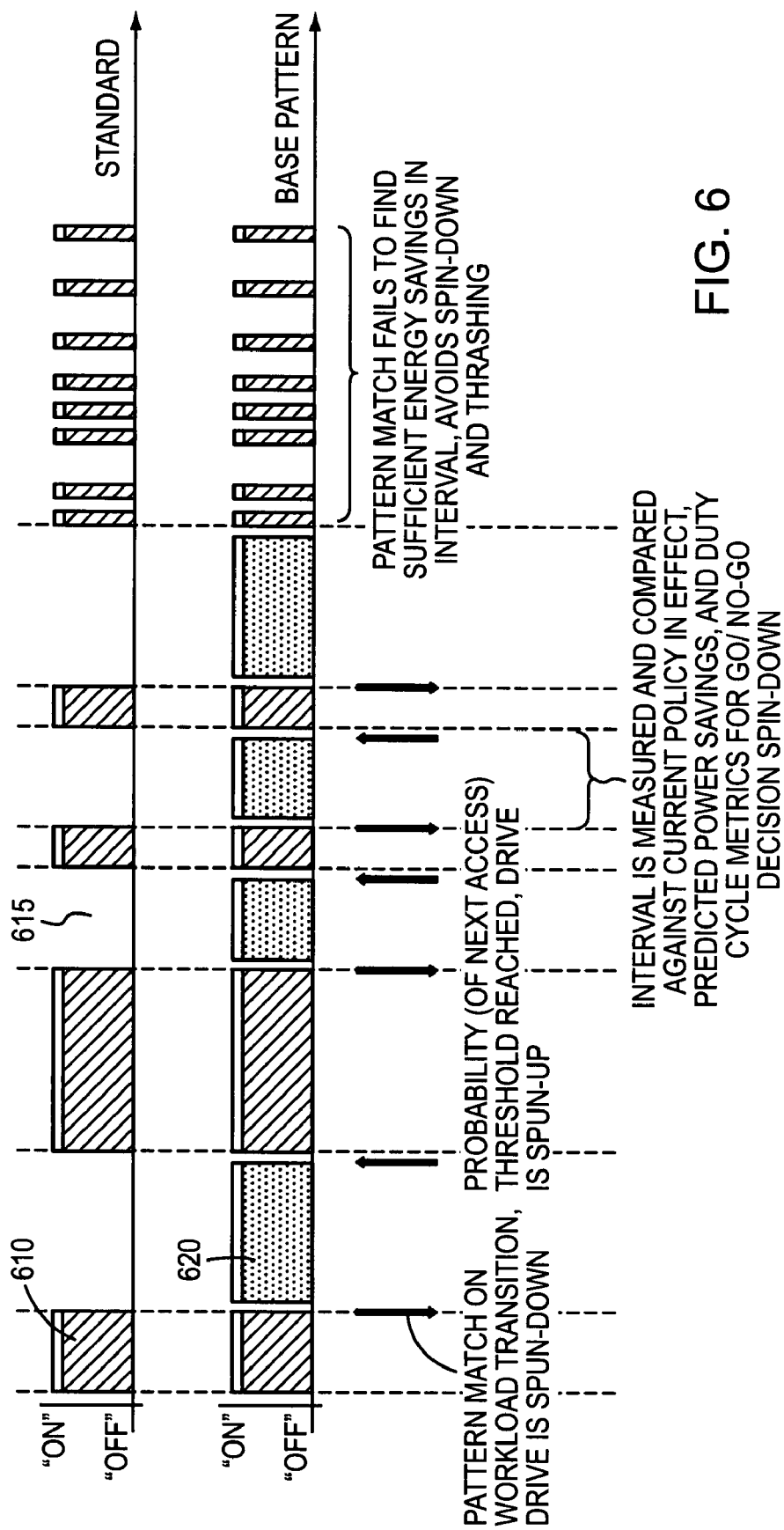
FIGS. 6-8 are timing diagrams showing aspects of example implementations of a technique for use with a storage system of FIG. 1.
Figure 7:
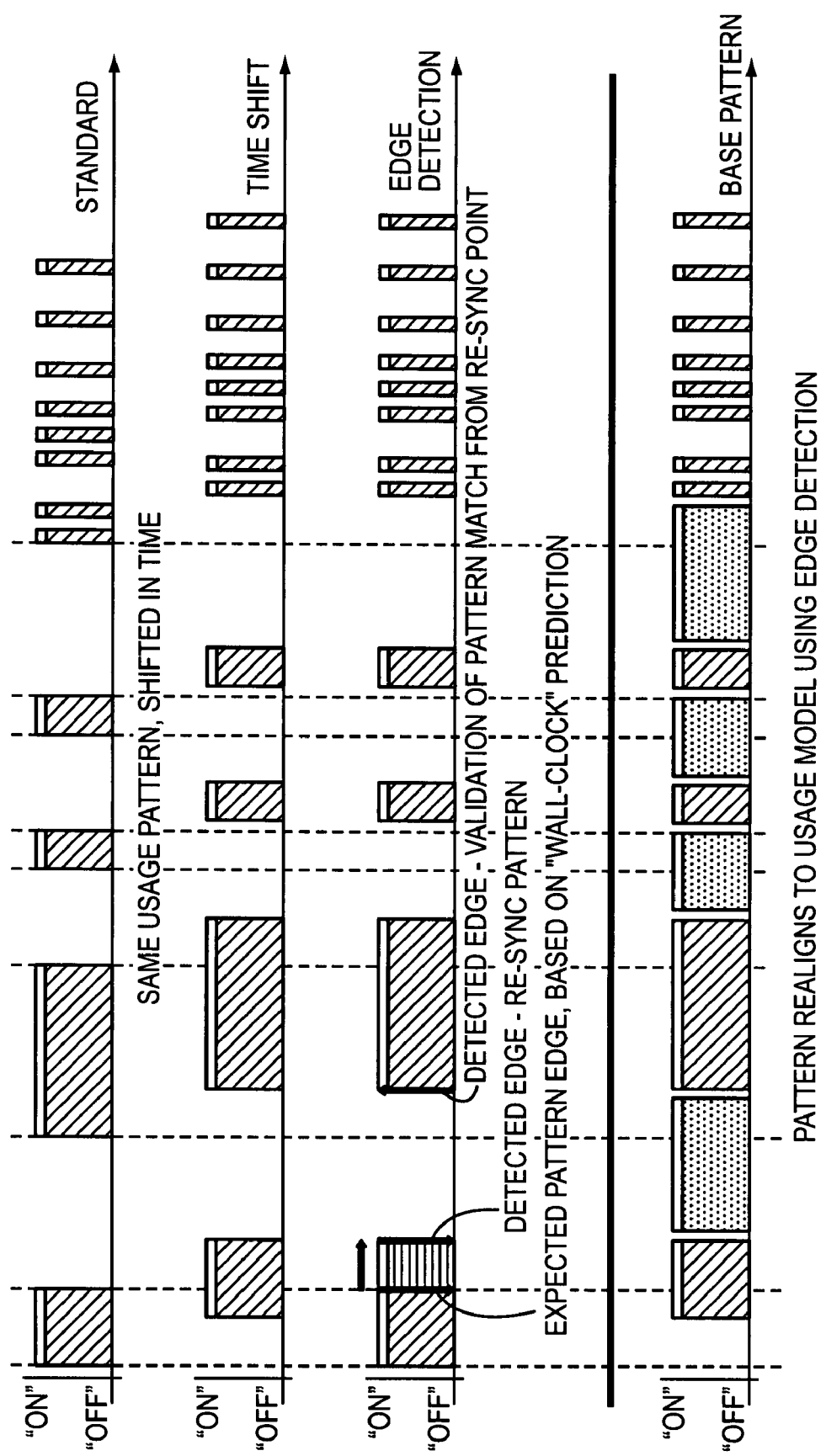
Figure 8:
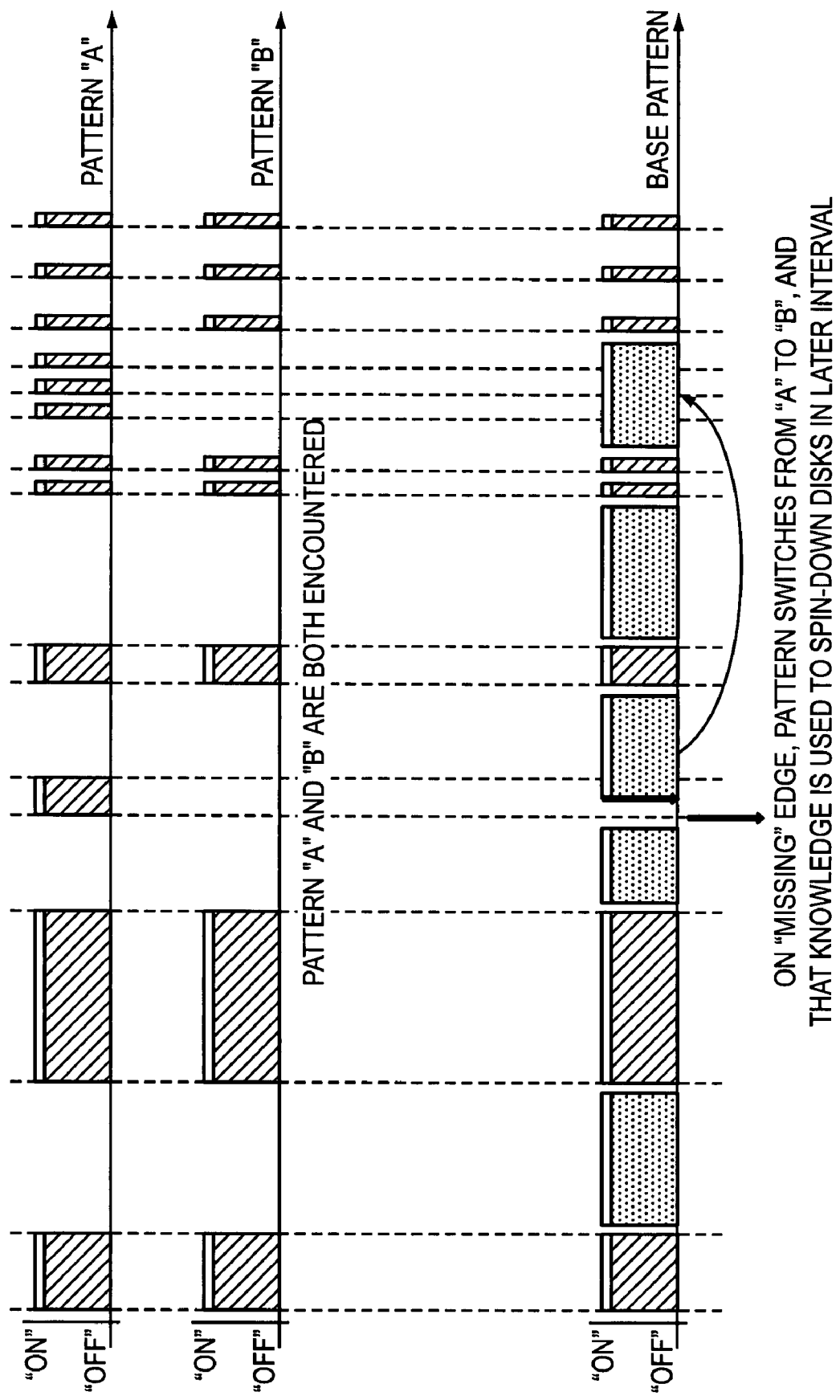

FIGS. 6-8 illustrate aspects of example implementations of the technique. Fascia 610 indicates actual drive access, blank space 615 indicates that the drive is spun up and not being accessed, and fascia 620 indicates that the drive is spun down.

As shown in FIG. 6, once a pattern of use (also called a usage pattern) indicated by fascia 610 is established, a pattern of spin down indicated by fascia 620 may be adopted so that the drive is spun down during a period of inactivity but is spun up before the next disk access, so that the response to such disk access is not delayed pending spin up of the drive. FIG. 6 also shows that thrashing is avoided by not spinning down the drive when the pattern of use indicates only short periods of inactivity.

A pattern of spin down may be established on the basis of a schedule such as a business hours schedule and/or on the basis of an analysis of the pattern of use such as a statistical analysis. Such a statistical analysis may be used to derive, for any given point in time, the probability that the drive will be accessed at that point. If such probability is derived continuously or frequently, the drive may be spun up or down when the probability crosses one or more thresholds, particularly to help avoid an instance in which the drive is not yet spun up when it is accessed.

FIG. 7 illustrates an aspect in which a time shift in a pattern of use is detected and is applied to the pattern of spin down. In particular, edge detection and/or correlation may be used in place of or in addition to a "wall clock" schedule. Thus, the pattern of spin down can be synchronized with the pattern of use even if the start time of the pattern of use varies.

In one or more implementations, a database may be used in an application which collects statistics and automatically determines and schedules appropriate spin up or spin down actions based on the statistics. The statistics may include, for example, time-based statistics and/or application-based statistics. Characteristics of the time of disk usage and/or application usage may be automatically determined. In at least one embodiment, automatically determining such characteristics may include automatically determining characteristics using the collected statistics, one or more policies, and/or one or more definitions. The policies and definitions may be defaults or may be customized by a user. Actions to be performed may be automatically determined based on the automatically determined characteristics. A schedule for performing the actions based on the statistics may be automatically determined. In at least one embodiment, the actions may be performed on disk drive spin up or spin down based on the schedule. The performing the actions may be confirmed and/or monitored. The results may be analyzed or monitored. Policies and/or definitions may be reconfigured based on the analyzing the results of the performing the scheduled actions.

A tuning analysis component may manage and automatically adjust thresholds used to monitor disk drive usage and the thresholds used in spin up and/or spin down determination. This component may use information from repository tables such as a disk drive usage history table, for example. This component may enable the system to tweak thresholds as needed to ensure the effectiveness of the spin up and/or spin down determination. The ability to govern its own thresholds may enable the system to spin up and/or spin down at the appropriate time. Therefore, in at least some implementations, as disk drive usage and/or applications change, users may not need to reconfigure the system to gain benefit from the technique. The decision-making capability provided in may reduce the level of experience required by the user. In at least one embodiment, thresholds and other configuration settings may be manually tuned by a user.

In general, statistical analysis as known in the art can be performed to help derive thresholds for use in controlling spin up and spin down.

FIG. 8 illustrates the technique's flexibility in that patterns may be distinguished and adjusted and selected dynamically.

Spin up and/or spin down may be application based, since some applications using the disk drive may be more tolerant of spin up based delays than other applications. For example, an application discovery application such as nLayers technology available from EMC Corp. may be used to automatically identify, map, and model the relationships and interdependencies between applications, servers, and devices such as disk drives in a time-based, behavioral model, and the results may be used to control disk drive spin up and/or spin down.

In general, the user may be able to tune spin up and/or spin down thresholds to be more or less aggressive, and may be able to manually override any automatic settings or actions.

A policy may be used to adjust aggressiveness of thresholds, or for some other purpose for spin up or spin down. For example, a policy may dictate that spin up or spin down be configured to benefit performance over power savings, or vice versa, e.g., depending on the time of day or application.

In general, the system seeks to conserve power when disk drive resources are not needed. The system may apply a policy in the technique to determine whether the disk drive should be spun up or spun down. Policies may be utilized generally in the scheduling of disk drive spin up and/or spin down. An urgency indicator may be used in accordance with the policy based either on a time-specific scheduling constraint that specifies an absolute deadline for specified disk drive access work or on a time-general scheduling constraint that specifies a percentage of disk drive access to be affected. Some applications demand that particular types of disk drive access work be consistently executed in a timely fashion for acceptable performance, and their disk drive access may be examples of work for which time-specific scheduling constraints are specified.

Other embodiments are within the scope of the following claims. For example, the above-described technique and/or aspects may be implemented, entirely or in part, in hardware or software (which may include firmware) or both hardware and software.

What is claimed is:

1. A method for use in managing disk drive power states, comprising:
    receiving information for use in determining a desired power state of a disk drive that is not currently being accessed, wherein the information comprises application-specific data indicating a tolerance of disk spin up based delays; and
    causing the disk drive to have a spun up power state before the disk drive is next accessed.

2. The method of claim 1, further comprising:
    based on the information, causing the disk drive to have a spun down power state when it is not being used.

3. The method of claim 1, further comprising:
    based on the information, avoiding causing the disk drive to have a spun down power state and a spun up power state in rapid repetition.

4. The method of claim 1, further comprising:
    deriving the information from an analysis of drive access usage.

5. The method of claim 1, further comprising:
    deriving the information from previous usage patterns; and
    based on the information, causing the disk drive to have a spun down power state.

6. The method of claim 1, further comprising:
    if it is determined to a sufficient likelihood that the disk drive will not be accessed again for a period of time, causing the disk drive to have a spun down power state.

7. The method of claim 1, further comprising:
    deriving the information from a policy pertaining to time of day schedule.

8. The method of claim 1, further comprising:
    deriving the information from a policy pertaining to day of the week schedule.

9. The method of claim 1, further comprising:
    treating the disk drive as being accessed if circuit board logic of the disk drive is being accessed.

10. The method of claim 1, further comprising:
    treating the disk drive as being accessed if data signals are read from or provided to the hard disk assembly of the disk drive.

11. The method of claim 1, further comprising:
    causing the disk drive to have a spun down power state by reducing power for both disk drive circuit board logic and disk drive hard disk assembly.

12. The method of claim 1, further comprising:
    causing the disk drive to have a spun down power state by reducing power for a hard disk assembly of the disk drive.

13. The method of claim 1, further comprising:
    performing, at a circuit logic board of the disk drive, the determination of the desired power state of the disk drive.

14. The method of claim 1, further comprising:
    performing, at a disk drive controller, the determination of the desired power state of the disk drive.

15. The method of claim 1, further comprising:
    performing, at a basic input/output system of a computer system, the determination of the desired power state of the disk drive.

16. The method of claim 1, further comprising:
    performing, at an operating system of a computer system, the determination of the desired power state of the disk drive.

17. The method of claim 1, further comprising:
    determining the desired power state of the disk drive; and
    causing multiple disk drives to have the desired power state.

18. The method of claim 1, wherein the information further comprises at least one of the following:
    statistical analysis, patterns, time, access data, application identity data, environment data, power pricing, temperature, humidity, policies.

19. A method for use in managing disk drive power states, comprising:
    based on application-specific data indicating a tolerance of disk spin up and spin down based delays, determining when a power state of a disk drive should be changed; and
    based on the determination, changing the power state of the disk drive at a specified time.

20. The method of claim 19, further comprising:
    based on a user, adjusting a policy controlling the power state of the disk drive.

* * * * *